United States Patent
Bliss et al.

(10) Patent No.: US 9,912,969 B1
(45) Date of Patent: *Mar. 6, 2018

(54) LIVE STREAMING VIDEO SHARING SYSTEM AND RELATED METHODS

(71) Applicants: Deep Blue Intention, LLC, Flagstaff, AZ (US); Arizona Board of Regents acting for Nor. Ariz. U., Flagstaff, AZ (US)

(72) Inventors: Lee Bliss, Flagstaff, AZ (US); Jenean M. Perelstein, Flagstaff, AZ (US); John C. Georgas, Flagstaff, AZ (US); Britt Weber Mullen, Flagstaff, AZ (US); Bryce Evan Carey, Flagstaff, AZ (US); Waylon Jay-Shije Dixon, Flagstaff, AZ (US); Chad Michael Ellsworth, San Tan, AZ (US)

(73) Assignees: Arizona Board of Regents acting for and on behalf of Northern Arizona University, Flagstaff, AZ (US); Deep Blue Intention, LLC, Flagstaff, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,604

(22) Filed: Jul. 25, 2016

Related U.S. Application Data

(63) Continuation of application No. 14/675,478, filed on Mar. 31, 2015, now Pat. No. 9,402,090, which is a
(Continued)

(51) Int. Cl.
*H04N 7/16* (2011.01)
*H04N 7/173* (2011.01)
(Continued)

(52) U.S. Cl.
CPC ... *H04N 21/2187* (2013.01); *H04N 21/23106* (2013.01); *H04N 21/2743* (2013.01);
(Continued)

(58) Field of Classification Search
CPC ............... H04N 7/17318; H04N 7/163; H04N 21/4126; G11B 27/105
See application file for complete search history.

(56) References Cited

U.S. PATENT DOCUMENTS

| | | |
|---|---|---|
| 8,370,874 B1 | 2/2013 | Chang et al. |
| 9,143,735 B2 | 9/2015 | Angiolillo et al. |

(Continued)

OTHER PUBLICATIONS

"Do more with Qik Video" by Qik, last accessed Oct. 3, 2013, available at http://qik.com.
(Continued)

*Primary Examiner* — Sumaiya A Chowdhury
(74) *Attorney, Agent, or Firm* — IPTechLaw

(57) ABSTRACT

A live streaming video sharing system. Implementations may include a video camera, portable computing device, video streaming server, database, application server, web server, and a portable computing device associated with a user operatively coupled together. The video camera sends a live stream of video data wirelessly to the portable computing device. The computing device associated with a user receives a live stream of video data from the web server, processes the live stream of video data, and generates a computer interface. The computer interface may include a public computer interface including a public channel and an invisible computer interface including an invisible shares channel associated with the user including an icon corresponding with one or more invisible shares, each invisible share corresponding with a live stream of video data and each invisible share not retrievable using a search form in
(Continued)

the computer interface, the application server, and the database.

4 Claims, 13 Drawing Sheets

Related U.S. Application Data continuation of application No. 14/150,583, filed on Jan. 8, 2014, now Pat. No. 8,997,167.

(51) Int. Cl.
| | |
|---|---|
| *H04N 21/2187* | (2011.01) |
| *H04N 21/2743* | (2011.01) |
| *H04N 21/4788* | (2011.01) |
| *H04N 21/482* | (2011.01) |
| *H04N 21/414* | (2011.01) |
| *H04N 21/647* | (2011.01) |
| *H04N 21/472* | (2011.01) |
| *H04N 21/4223* | (2011.01) |
| *H04N 21/231* | (2011.01) |
| *H04N 21/433* | (2011.01) |

(52) U.S. Cl.
CPC ... *H04N 21/41407* (2013.01); *H04N 21/4223* (2013.01); *H04N 21/4788* (2013.01); *H04N 21/47202* (2013.01); *H04N 21/4828* (2013.01); *H04N 21/64707* (2013.01); *H04N 21/4334* (2013.01)

(56) References Cited

U.S. PATENT DOCUMENTS

| | | |
|---|---|---|
| 2002/0056119 A1 | 5/2002 | Moynihan |
| 2003/0169285 A1 | 9/2003 | Smith et al. |
| 2004/0114036 A1 | 6/2004 | Karaoguz et al. |
| 2008/0222689 A1* | 9/2008 | Howcroft ........... H04N 21/4223 725/110 |
| 2011/0107238 A1 | 5/2011 | Liu et al. |
| 2013/0198788 A1* | 8/2013 | Barger ................ H04N 21/266 725/93 |
| 2013/0227106 A1 | 8/2013 | Grinshpun et al. |

OTHER PUBLICATIONS

"Step up to Qik Premium and do more!" by Qik, last accessed Oct. 3, 2013, available at http://qik.com/info/premium.

"Google Glass" from Wikipedia, last accessed May 8, 2013, available at http://en.wikipedia.org/wiki/Google Glass.

"Sony Announces New Wi-Fi enabled Bloggie Live HD Camera" by the Qik Blog, last accessed May 8, 2013, available at http://qik.com/blog.

* cited by examiner

LIVE STREAMING VIDEO SHARING SYSTEM AND RELATED METHODS

CROSS REFERENCE TO RELATED APPLICATIONS

This application is a continuation application of the earlier U.S. Utility Patent Application to Lee Bliss, et al., entitled "Live Streaming Video Sharing System And Related Methods," application Ser. No. 14/675,478, filed Mar. 31, 2015, now pending, which was a continuation application of the earlier U.S. Utility Patent Application to Lee Bliss, et al., entitled "Live Streaming Video Sharing System And Related Methods," application Ser. No. 14/150,583, filed Jan. 8, 2014, now U.S. Pat. No. 8,997,167, issued Mar. 31, 2015, the disclosures of which are hereby incorporated entirely herein by reference.

BACKGROUND

1. Technical Field

Aspects of this document relate generally to systems and methods used for streaming video across a telecommunications network to computing devices.

2. Background Art

Conventional video capture devices such as camcorders capture video by constructing a series of video frames and capturing surrounding audio using a microphone. Various data formats for storing the video and audio information and synchronizing the video and audio have been developed. Conventional video capture devices are directed to the capturing and storage of video and audio for playback at a later time to a particular viewer.

SUMMARY

Implementations of live streaming video sharing systems may include a video camera, a portable computing device operatively coupled with the video camera through a wireless telecommunication channel, and a video streaming server operatively coupled with the portable computing device through a wireless telecommunication channel. The system may also include a database operatively coupled with the video streaming server and a web server. The video camera may be adapted to send a live stream of video data using a first data transmission protocol across the wireless telecommunication channel to the portable computing device. The portable computing device may be adapted to receive the live stream of video data in the first data transmission protocol, process the live stream of video data, and send the live stream of video data across the wireless telecommunication channel using a second data transmission protocol to the video streaming server. The video streaming server may be adapted to receive the live stream of video data, process the live stream of video data in the second data transmission protocol, and send the live stream of video data using a third data transmission protocol into a telecommunication channel. The system may also include a computing device associated with a user where the computing device is adapted to receive the live stream of video data, process the live stream of video data in the third data transmission protocol, and generate a computer interface in response to receiving the live stream of video data. The computer interface may include a public computer interface including one or more public channels including one or more icons corresponding with one or more public shares where each public share corresponds with a live stream of video data. The public computer interface may also include a search form adapted to permit a user to search all public shares in the system using the application server and the database to retrieve a list of all public shares associated with a search term entered into the search form where each public share corresponds with a live stream of video data. The computer interface may also include an invisible computer interface including an invisible shares channel associated with the user where the invisible shares channel includes one or more icons corresponding with one or more invisible shares, each invisible share corresponding with a live stream of video data and each invisible share not retrievable using the search form, the application server, and the database. The invisible computer interface may further include an invisible shares inbox associated with the user which includes one or more icons corresponding with one or more invisible shares received by the user from another user of the system. One of the icons in the public computer interface or the invisible computer interface is associated with the live stream of video data and may be adapted, when selected by the user, to generate a viewing computer interface that includes the live video stream from the video camera.

Implementations of live streaming video sharing systems may include one, all, or any of the following:

The video camera may be a point-of-view (POV) video camera and the live stream of video data may be a live stream of POV video data.

The computer interface may further include a private computer interface including one or more private channels including one or more icons corresponding with one or more private shares associated with the user where the association of each of the one or more private shares is established through the database and an account associated with the user.

The system may further include a sharebox interface which may include one or more public and/or one or more private shares sent to the user by one or more other users of the system using the application server and the database. Each of the one or more public and/or the one more private shares may be adjacent to an icon representing an identity of the one or more other users of the system.

The computer interface may further include a tap button adjacent to a channel where the tap button is configured to permit a user to store an indication in the database that configures the application server to send a notification to the user when a new share for the channel adjacent to the tap button is available.

The invisible computer interface may include a share fault and a receive value associated with the user, each of the share vault and the receive vault being configured to receive an address associated with another user of the system and permit the user to receive invisible shares from the user associated with the address.

Implementations of live streaming video sharing systems may utilize implementations of a method of generating and transmitting live streaming POV video. The method may include encoding live POV video data using a POV video camera and streaming the live POV video into a wireless telecommunication channel to a portable computing device operatively wirelessly coupled with the video camera where the live POV video is transmitted using a first data transmission protocol. The method may also include streaming the live POV video data into a wireless telecommunication channel to a video streaming server operatively coupled with the portable computing device through a wireless telecommunication channel where the live POV video data is transmitted using a second data transmission protocol. In response to receiving the live POV video data, the method may include recording one or more channel characteristics associated with the live POV video and included in the live POV video data in a database operatively coupled with the video streaming server and an applications server using the video streaming server or the application server. The method may also include streaming the live POV video data into a telecommunication channel to a computing device associated with a user using one of the video streaming server, the application server, and a web server where the live POV video data is transmitted using a third data transmission protocol. The method may include processing the live POV video data and generating a computer interface using the computing device and the one or more channel characteristics. The computer interface may include, if the one or more channel characteristics indicate the live POV video data is associated with a public channel, a public computer interface. The computer interface may include, if the one or more channel characteristics indicated that the live POV video data is associated with an invisible channel associated with the user, an invisible computer interface. One of the icons in the public computer interface or the invisible computer interface is associated with the live POV video data. In response to selection of an icon associated with the live POV video data, the method may include playing live POV video using the live POV video data in a viewing computer interface using the computing device.

Implementations of a method of generating and transmitting live streaming POV video may include one, all, or any of the foregoing:

The method may include caching the live POV video data on the application server to form a share and providing access to another user of the system to the share on the application server using the database and the application server by generating an icon in one of the public computer interface, a private computer interface, or the invisible computer interface corresponding with the share if the share is public share, private share, or invisible share, respectively.

The method may also include storing an entire quantity of live POV video data associated with the share on the application server and providing access to another user of the system to the share on the application server using the database and the application server by generating an icon in the private computer interface or the invisible computer interface corresponding with the share if the share is a private share or invisible share, respectively.

The method may further include sharing the live POV video data with another user of the system by caching the live POV video data or storing an entire quantity of live POV video data using the application server or the video streaming server to create a share. In response to selecting of an address associated with the other user, the method may include creating an icon in a sharebox computer interface associated with the other user using the database and the application server and a computing device associated with the other user.

The method may further include sharing the live POV video data from the user with a receiving user of the system by caching the live POV video data or storing an entire quantity of live POV video data using the application server or the video streaming server to create an invisible share. The method may further include in response to entry of an address associated with the receiving user in a share vault associated with the user included in the invisible computer interface and entry of an address associated with the user of the system into a receive vault associated with the receiving user included in an invisible computer interface on a computing device associated with the receiving user. The method may then include creating an icon in an invisible channel included in the invisible computer interface associated with the receiving user using the database and the application server.

The method may further include activating the POV video camera to enter a channel selection mode, audibly speaking one or more names of one or more channels associated with the user from the POV video camera using an earpiece coupled to the POV video camera, receiving a selection of a channel, audibly speaking the name associated with the selected channel, and activating the POV video camera to enter a recording mode.

The method may further include determining a location of the POV video camera using a global positioning system (GPS) signal received by the POV video camera and a location services system accessed wirelessly by the POV video camera through the portable computing device associated with the user and assigning one or more contextual geographical search terms to the channel selected using the location and the POV video camera. The method may also include including one of the location and the one or more contextual geographical search terms in the one or more channel characteristics.

The method may further include where recording one or more channel characteristics associated with the live POV video and included in the live POV video data further includes where the one or more channel characteristics are a location of the POV video camera, one or more contextual geographic search terms, an address associated with a user, a channel name, a channel type, or any combination thereof.

Implementations of live streaming video sharing systems may utilize implementations of a method of transmitting live streaming video to a public channel and to an invisible channel. The method may include receiving live video data using a streaming server from a wireless telecommunication channel where the live video data is transmitted using a second data transmission protocol and a portable computing device. The portable computing device receives the live video data from a wireless telecommunication channel using a first data transmission protocol from a video camera. In response to receiving the live video data, the method may include recording one or more channel characteristics associated with the live video included in the live video data in a database operatively coupled with the video streaming server and an application server using the application server or the video streaming server. The method may further include providing access to the live video data using the database and the one or more channel characteristics through a telecommunication channel using the video streaming server, the application server, or a web server where the video streaming server, the application server, or the web server are adapted to, in response to a request from a computing device associated with a user, stream the live video data using the telecommunication channel and a third data transmission protocol to the computing device. The computing device may be adapted to generate a computer interface using the computing device and the one or more channel characteristics. The computer interface may include, if the one or more channel characteristics indicate the live video data is associated with a public channel, a public computer interface. The computer interface may, if the one or more channel characteristics indicated the live video data is associated with an invisible channel associated with the user, a private computer interface. One of the icons in the public computer interface or in the private computer interface is associated with the live video data. In response to selection of an icon associated with the live video data in the public computer interface or in the private computer interface, the computing device may be adapted to play live video using the live video data in a viewing computer interface.

Implementations of a method of transmitting live streaming video to a public channel and to an invisible channel may include one, all, or any of the following:

The method may include sharing the live video data with another user of the system by caching the live video or storing an entire quantity of live video data using the application server or the video streaming server to create a share and in response to a selection of an address associated with the other user, creating an icon in a sharebox computer interface associated with the other user using the database and the application server and a computing device associated with the other user.

The method may further include sharing the live video data from the user with a receiving user of the system by caching the live video data or storing an entire quantity of live POV video data using the application server or the video streaming server to create an invisible share. The method may further include, in response to entry of an address associated with the receiving user in a share vault associated with the user included in the invisible computer interface and entry of an address associated with the user of the system into a receive vault associated with the receiving user included in an invisible computer interface on a computing device associated with the receiving user, creating an icon in an invisible channel included in the invisible computer interface associated with the receiving user using the database and the application server.

The method may further include activating the video camera to enter a channel selection mode, audibly speaking one or more names of one or more channels associated with the user from the video camera using an earpiece coupled to the video camera, receiving a selection of a channel, audibly speaking the name associated with the selected channel, and activating the video camera to enter a recording mode.

The method may include determining a location of the video camera using a GPS signal received by the video camera and a location services system accessed wireless by the video camera through the portable computing device associated with the user, and assigning one or more contextual geographical search terms to the channel selected using the location and the video camera. The method may also include including one of the location and the one or more contextual geographical search terms in the one or more channel characteristics.

Recording one or more channel characteristics associated with the live video and included in the live video may include wherein the one or more channel characteristics are a location of the video camera, one or more contextual geographic search terms, an address associated with a user, a channel name, a channel type, or any combination thereof.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended live streaming video sharing system will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such live streaming video sharing system, and implementing components and methods, consistent with the intended operation and methods.

Figure 1:
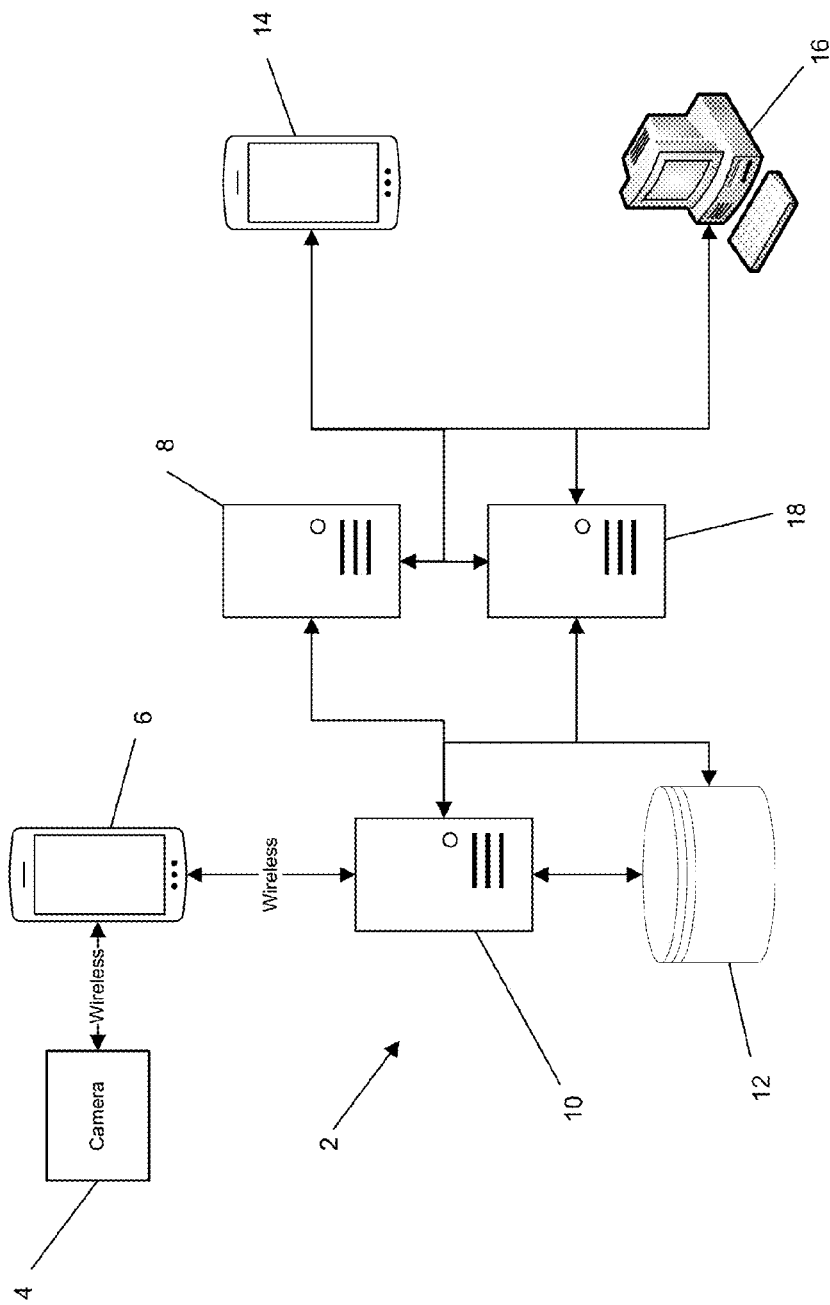
FIG. 1 is a block diagram of an implementation of a live streaming video sharing system.

Referring to FIG. 1, an implementation of a live streaming video sharing system 2 is illustrated. As illustrated, the system 2 includes a video camera 4 that is coupled wirelessly to a portable computing device 6. Due to the wireless nature of the connection, the video camera 4 is physically separate from the portable computing device 6. In various implementations of the system the video camera 4 is a capshall. As used herein, the term "capshall" is a term that refers to a video camera device that engages with a human ear (and may be oriented over the human ear) which contains an audio input/output component. A capshall contains a video component that is pointed outwardly away from a user in the same perspective as the user's eye and may be approximately located at eye level. The audio component of the capshall is positioned to be close to the auditory canal to permit the user to hear the output from the capshall in privacy, similar to a headphone design. In addition, the audio component of the capshall includes a microphone that is directed to capture sounds coming from the same direction that the video being taken by the device is coming as well as speech commands from the user.

In various implementations, the audio component of the capshall may take the form of an earpiece coupled to the video component. The capshall permits the user to be able to take point-of-view (POV) video. Point-of-view video refers to a perspective that is substantially the same as what the user sees with their eyes in a particular place or situation and which continuously moves with any change in the user's position to show what the user can see. Since the capshall is worn by the user on their head and the video component may be positioned near eye level, the capshall permits the capture of live POV video (including audio) from the user's point of view and perspective. The capshall may also include other user interface components, such as one or more buttons to enable user selection of various options that are audibly spoken by the audio component.

Implementations of the video camera 4 may continuously capture video and, therefore, act as a source of live video. In those implementations where the video camera 4 generates a stream of live video, the video camera 4 may process the POV video into POV video data using either hardware or software encoding techniques. The video camera 4 may then send the POV video data to the portable computing device 6 by transmitting (streaming) the live POV video data into a wireless telecommunication channel using a first data transmission protocol. The nature of the data transmission protocol used may vary. In particular implementations, the first data transmission protocol is the protocol marketed under the tradename BLUETOOTH by the Bluetooth Special Interest Group, Inc. of Kirkland, Wash. In implementations employing BLUETOOTH, the video and audio data included in the live POV video data are transmitted across the channel using the Audio/Video Distribution Transport Protocol (AVDTP). The AVDTP works to handle the signaling another coordination of the video and audio streams and interacts with lower level protocols in the BLUETOOTH protocol stack such as Link Manager Protocol (LMP), Logical Link Control Adaptation Protocol (L2CAP), Service Discovery Protocol (SDP), SIM Access Protocol (SAP), and Host Controller Interface (HCl) to ensure that the video and audio streams are and remain synchronized as they are transmitted from the video camera 4 and received and processed by the portable computing device 6.

In various implementations, AVDTP is used to control the signaling communication between the video camera 4 and the portable computing device 6 to ensure that the live POV video (and audio) stream being received remain synchronized. Various algorithms to accomplish this may be employed in various implementations. In particular implementations, buffering may be employed by the video camera 4, portable computing device 6, or both in a "slowest horse" approach. In this technique, if the audio stream is determined to be being transmitted more slowly, then the video stream speed is reduced to match the audio stream pace. If the video stream speed is determined to be slower, then the audio stream transmission rate is reduced to match the video stream transmission rate. In particular implementations, a buffer of 1-10 seconds is employed to enable the algorithm to work to keep the audio and video synchronized as they are being transmitted from the video camera 4 and/or being received and processed by the portable computing device 6.

In various implementations, the use of various video resolutions is also employed as an aid in assisting in keeping the audio and video streams synchronized in recording time. For example, the video resolution may be about 200 pixels by 200 pixels, about 300 pixels by 300 pixels, 500 pixels by 500 pixels or any other desired resolution or combination of pixel resolutions (i.e., 500 pixels by 300 pixels) that assists with ensuring the live stream can be transmitted successful with the audio stream. In various implementations of the system 2, this means that the ultimate viewing size of the video stream matches the video resolution captured and/or transmitted by the video camera 4. Because the resolution of the live POV video data being transmitted may be lower than resolutions such as high definition (1920×1080 or 1440× 1080) the quantity of video data may be significantly reduced, permitting higher reliability in transmission of the video data over telecommunication channels of varying or limited bandwidth capability, which is often the case in wireless telecommunications. The lower resolution may also ensure better control of the video and audio streams to ensure they maintain synchronization.

The portable computing device 6 may be any of a wide variety of computing devices 6. These include, by non-limiting examples, cell phones, smart phones, tablets, laptop computers, wearable computing devices, e-readers, and any other computing device that can be carried by a user. Various functions performed by the portable computing device 6 may be carried out by software operated by the portable computing device 6, which may take the form of an "app" that a user installs on the portable computing device 6 and downloads from a repository associated with the system 2. The portable computing device 6 contains a first wireless communication portion that is complementary to the wireless communication portion contained in the video camera 4, and which may, in various implementations, may be that marketed under the tradename BLUETOOTH.

The portable computing device 6 receives the live stream of POV video data and processes it. During processing, AVDTP may be used by the portable computing device 6 to engage in and implement the signaling to enable the algorithms designed to ensure that the video data stream and audio data stream are kept synchronized. The portable computing device 6 also has a second wireless communication portion which is used to communicate across a wireless telecommunication channel using a second data transmission protocol. In various implementations, the second data transmission protocol may be any technique or protocol categorized under the 3G mobile telecommunication standard, such as the International Mobile Telecommunications-2000 (IMT-2000) specification. In other implementations, the second data transmission protocol may be any technique or protocol categorized under the 4G mobile telecommunication standard, such as the International Mobile Telecommunications Advanced (IMT-Advanced) specification.

The wireless telecommunication channel may include many intermediate wireless and wired networking components in various implementations, depending upon how the 3G or 4G network is designed. For example, the channel may include a tower, which wirelessly receives the signal from the portable computing device 6 and then transfers the live stream of video (and audio) data to a wired network for further transmission. Because at least a portion of the route to the portable computing device 6 involves a wireless transmission, this network configuration is a wireless telecommunication channel. The live stream of POV video is received by video streaming server 8 in a variety of possible configurations. In the implementation illustrated in FIG. 1, the video streaming server 8 is coupled to the portable computing device 6 through an application server 10, which serves to initially receive the live POV video stream and any channel characteristics included in the live POV video stream and write relevant information to database 12 coupled to the application server 10. In other implementations, however, the video streaming server 8 may be directly coupled to the portable computing device 6 and send information, including channel characteristics to the application server 10 and/or the database 12. A wide variety of network configurations are possible using the principles in this disclosure.

Video streaming server 8 receives the live POV video (and audio) stream and processes (caches) it. In particular implementations, the video streaming server 8 downloads the live POV video stream in the form of an FLASH video file (.flv file) being created and stored on the portable computing device 6. The video streaming server 8 then uses various methods and software marketed under the tradename VLC by the VideoLan Organization of Paris, France to convert the format of video stream data to a format that is streamable, such as, by non-limiting example, a session description protocol (.sdp) formatted file. The video streaming server 8 then uses the various methods and software marketed under the tradename DARWIN STREAMING SERVER (DSS) by Apple, Inc. of Cupertino, Calif. to make the live POV video data stream available for broadcasting using the Real-Time Streaming Protocol (RTSP). This technique treats the portable computing device 6 as a web server with a web address on which the .fly file can be accessed and downloaded across the wireless telecommunication network by the video streaming server 8. Once the data has been downloaded as a local file, the video streaming server 8 uses VLC to reformat the data to an .sdp file which DSS is used by the video streaming server 8 to broadcast over a telecommunication channel.

Other techniques may also be employed by the video streaming server 8 to receive the live POV video stream and broadcast it across the telecommunication channel, depending on the characteristics and software that exist on the portable computing device 6. For example, where the operating system run on the portable computing device 6 is that marketed under the tradename ANDROID by Google, Inc. of Mountain View, Calif., the methods implemented in the MediaRecorder class may be used by the portable computing device 6 to write a byte stream of data containing the live POV video data to the video streaming server 8 to create a 3GPP (0.3gp) multimedia file for broadcasting using DSS. In other implementations, the methods included in the software marketed under the tradename SIPDROID by Google may be employed to transfer the live POV video data from the portable computing device 6 to the video streaming server 8 for broadcasting with DSS. In other implementations, the Real-time Transport Protocol (RTP) may be used as implemented by ANDROID 4.0 ICE CREAM SANDWICH operating system version and other operating systems used by the portable computing device 6 to stream live POV video data to the video streaming server 8.

The live POV video data is made available by the video streaming server 8 to other users of the system 2 in several system configurations. As illustrated in FIG. 1, the video streaming server 8 may process the live POV video data and send the live stream of video data using a third data transmission protocol into a telecommunications channel directly to a portable computing device 14 associated with another user or a computing device 16 associated with another user of the system. The third data transmission protocol may include any wired or wireless data transmission protocol, such as, by non-limiting example, Ethernet, 3G, 4G, BLUETOOTH or any other presently existing or future protocol. The telecommunications channel used may include any number of wired and/or wireless networking components that couple the portable computing device 14 and computing device 16 with the video streaming server 8. In another system configuration, the portable computing device 14 and computing device 16 may receive the live stream of POV video data from a web server 18 which controls access to the data stream by the users through interacting with the application server 10 and the database 12. In this case, the web server 18 forwards and/or processes the live stream of POV video data from the video streaming server 8 to the portable computing device 14 and the computing device 16.

The portable computing device 14 may be any previously disclosed in this document. The computing device 16 may be a portable computing device type but also may be a desktop computer, server, workstation, or other computing system not configured to be physically carried by a user. Furthermore, the various servers discussed in this document may operate on physically separate hardware or may be virtualized and operating on one or more shared physical hardware servers.

The portable computing device 14 and the computing device 16 receive the live POV video stream and process it, generating various computer interfaces that permit the user of the system 2 or prospective user of the system 2 associated with the portable computing device 14 or the computing device 16 to view the POV video. The particular computer interface constructed depends on the relationship the user streaming the live POV video (streaming user) has with the user attempting the view the POV video (viewing user) and the relationship the viewing user has with the system 2 (i.e., does the viewing user have an account with the system 2 or not?). What the computer interfaces enable the viewing user to do is view the live POV video (or saved POV video in particular situations) in the form of a "share" or "saved share." A "share," as used herein, is defined as a live POV streaming video clip that may be accessed and displayed to a viewing user through a computer interface. The term "saved share," as used herein, is defined as a live POV streaming video clip, or share, that has been saved by a streaming user on the system 2, whether on the database 12, video streaming server 8, web server 8, or other video and audio storage device associated with the system 2.

Figure 8:
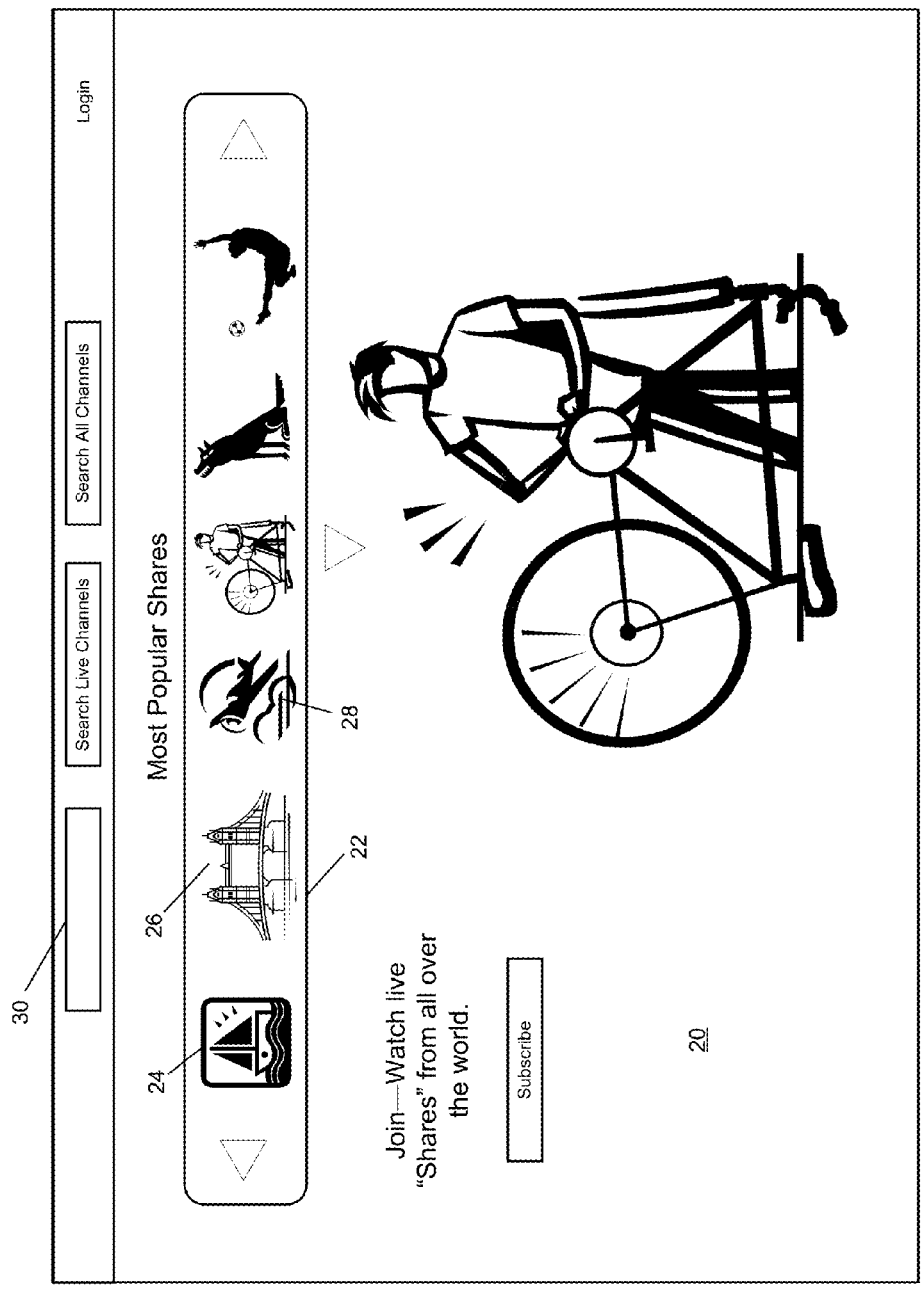
FIG. 8 is a view of an implementation of a public computer interface.

Referring to FIG. 8, an implementation of a public computer interface 20 is illustrated. As illustrated, the interface 20 includes a public channel 22 that shows a plurality of public shares each represented by icons 24, 26, 28. The term "share channel" or "channel," as used herein, is a website organizational structure used to identify and categorize shares based on their content and/or access by other users of the system. A user of the system may be provided with any suitable number of channels for organizing and streaming different types of shares, such as one, two, three, four, five or more, ten or more, twenty of more and any other number. A channel may be public, private or invisible, depending upon the access the streaming user provides to the one or more shares associated with that particular channel. The association of a particular share with a particular channel is made by the streaming user using the application server 10 and database 12 at the time of recording of the share or afterward, in the case of a saved share. The public interface 20 includes a search form 30 that permits the viewing user to search all of the public channels and public shares in the system at a given time. As illustrated, searches by channels that currently have live POV video content can be included and searches by all channels, including those that do not currently have live POV video content is enabled through respective search buttons.

The term "public share," as used herein, is defined as a share that is been made accessible to any user by the streaming user and may be discovered through a search. The term "private share," as used herein, is defined as a share that is only viewable by users that have been authorized to view it by the streaming user but may be discovered through a search by all other users of the system. For example, a private channel may appear in the search results by all users, but shares streamed through the private channel may not be viewed unless access is provided by the streaming user. An invisible channel cannot be identified through a search and access is limited to those users that have been provided access. A channel may be searched by a user's ID. A channel may have an associated geographical search term that is related to the user's location or the location where the share was recorded.

As illustrated in in FIG. 8, one of the icons in the public channel 22 has been selected, which provides a larger view of the icon in preparation for the viewing user to begin to watch the share. As illustrated, the title of the public channel 22 is "Most Popular Shares" and, accordingly, the public shares included in the public channel could be, for example, those that are currently being viewed by the most users of the system. In various implementations of the system, the viewers of public shares may include those who have not established a user account with the system; in others, to view the shares, the prospective viewers may be required to establish a user account.

Figure 2:
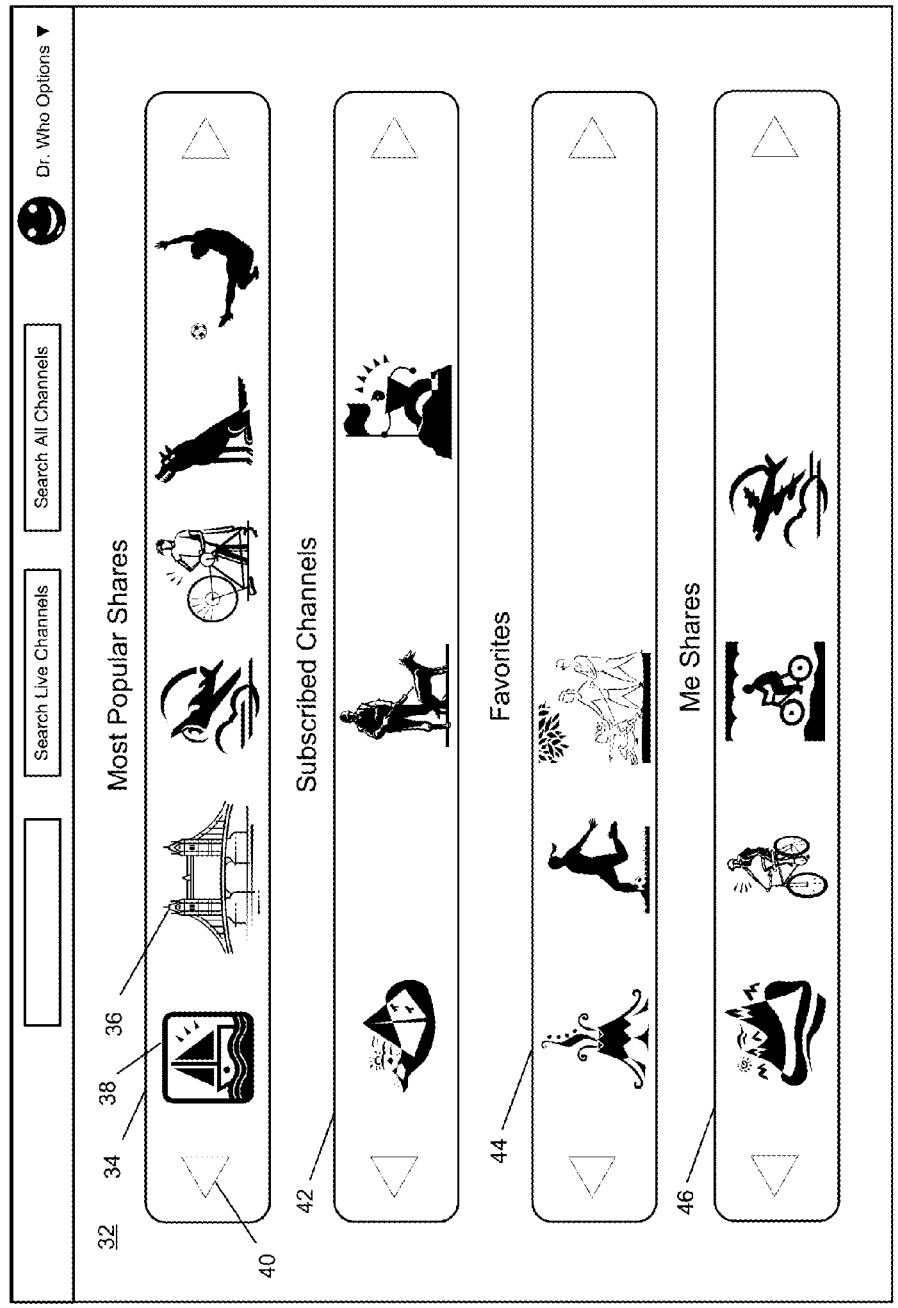
FIG. 2 is a view of an implementation of a home screen computer interface.

Referring to FIG. 2, an exemplary home screen 32 having a number of channels with associated share icons is illustrated. A most popular channel 34 includes icons 36, 38 for the most popular live shares currently being streamed by the system 2. In particular implementations, the icons 36, 38 may show the actual video in a reduced thumbnail size, an icon type corresponding to the subject matter of the share, the content of the share, or any other desired image type. The scroll icon 40 shown on either side of the most popular display, allows a user to scroll the channel window to see other most popular shares. A subscribed channels channel 42 shows icons for any currently live shares from channels within the system that the user has currently subscribed to, which could include channels associated with other system users and paid subscription channels. To subscribe to a channel, the user must have first been provided access to the streaming user's channel, and/or one or more shares included in that channel. Once subscribed, the shares in the streaming user's channel are then sent to the viewing user's share box interface (to be discussed later) for viewing either live or saved.

A favorites channel 44 shows icons representing any live shares from channels that the user has tagged as favorites using the system which may be public or private shares from public or private channels. Any suitable display technique may be used to indicate that a live share is being streamed to a channel. For example, the icon for a particular share may flash, grow in size as it goes live, or have a border that changes color or flashes.

Also shown in FIG. 2 is a me-shares channel 46 shows shares from the user's channels. As illustrated at the upper right of the interface 32, the particular user logged into the system 2 is identified by an icon, username, or other avatar associated with the user along with a drop down menu that lists various account options when the user is logged in (Dr. Who Options). In various implementations, the user may label the channel with another title and provide a user defined icon for the channel.

Figure 3:
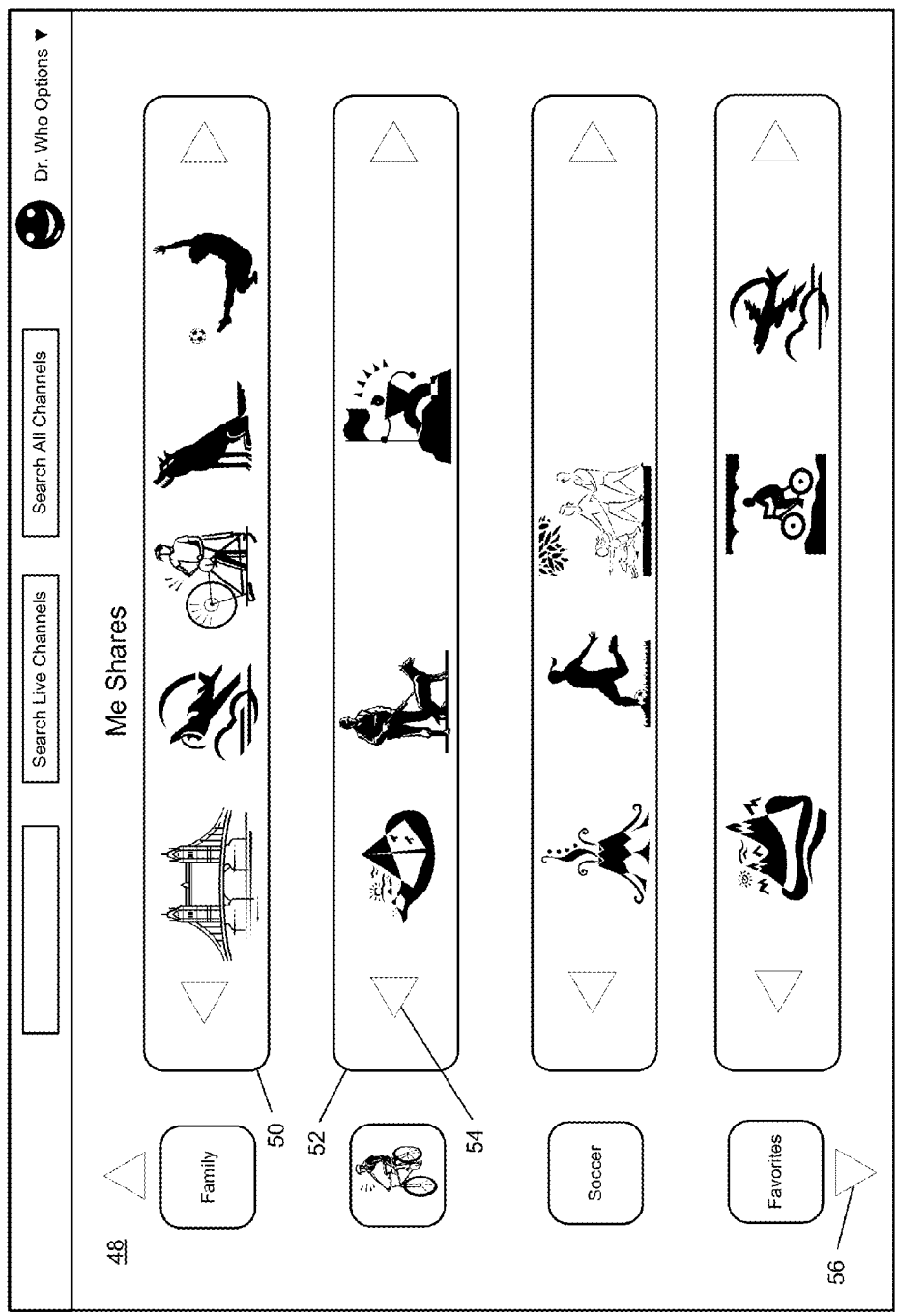
FIG. 3 is a view of an implementation of a me-shares computer interface.

FIG. 3 illustrates an implementation of a me-shares interface 48 (private computer interface) illustrating a plurality of channels 50, 52 that form a me-shares library. A user may organize, view, delete and share shares that the user has or will be recording within the me-shares library. As these shares are created by the user, they are private shares unless the user decides to make them public using the system 2 or give other users access to view them. As shown in FIG. 3, a portion of the user's channels are shown as horizontal containers having five icons visible per channel. As was previously mentioned, various scroll icons 54, 56 may be used to move to different channels and to different shares within channels. In the me-shares interface 48, the various shares that are displayed may be both saved shares as well as live shares. In the other interface types, such as the public interface 20 and the home screen 32, only live POV video shares may be visible in the channels. All shares associated with a particular user that are saved shares may be visible in this me-shares interface 48. When a user decides to delete a particular saved share, it is permanently removed from the system.

Figure 4:
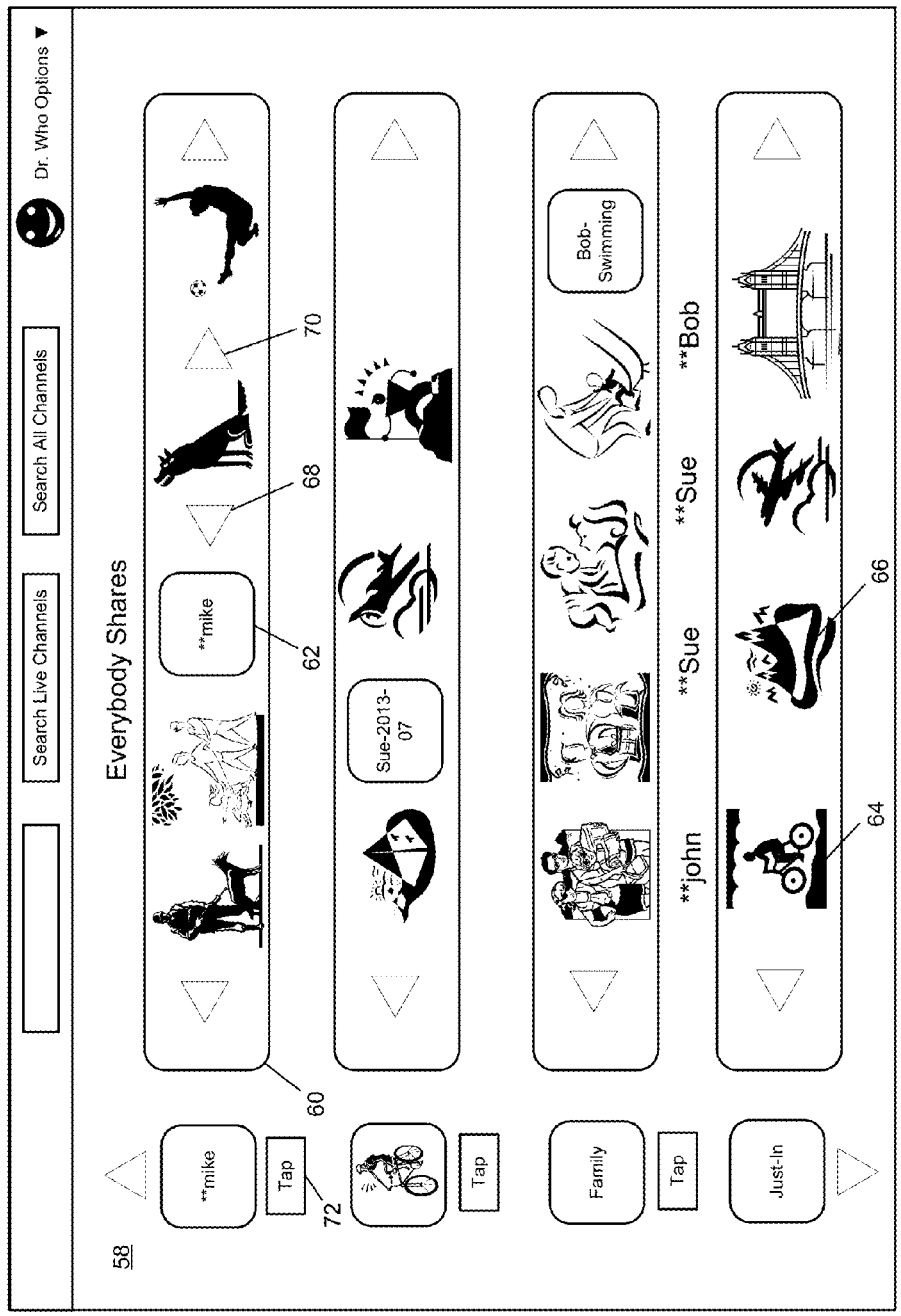
FIG. 4 is a view of an implementation of a everybody-shares computer interface.

FIG. 4 illustrates an implementation of an everybody-shares interface 58 that illustrates various shares from other users of the system. As illustrated, a channel 60 may be accompanied by an icon 62 that lists a user's user name, screen name, or system name. In particular implementations, as illustrated, the user name may take the form of a duostar name (mike). The user may set up the channel (private channel) 60, or the system 2 may set up the channel 60 when the user streaming the content allows the viewing user access to view the streamed share. As illustrated, some shares from a user may be private shares, and visible in the user's channel in the everybody-shares interface, but the icon 62 representing that private share may have the user's duostar address or other identifier (but no image), indicating that the user who is logged into the everybody-share's interface has not been given permission to see the private share. The user who wishes to see the private share may be able to contact the user by selecting the icon to request permission to see the share through the system 2. Some public shares that the user has not associated with a particular channel may be included in a Just-In channel and may be added to existing channel or inserted into a newly defined channel. The shares 64, 66** shown have the respective streaming users' subscriber names above the share icons.

As illustrated, additional scroll icons 68, 70 may be included within the channel container of a channel to permit the user to move a particular share icon within its position within the channel. Also, as illustrated, one or more tap buttons 72 may be included adjacent to the channel 60 which allow the system 2 (whether through the application server 10 or web server 18) to store a record in the database 12 that the user would like to be notified when a new share for the channel 60 is available. This notification may take place through the sending of an email, a text message, a push notification in an app, or any other notification to the user that a new share is available in that channel. As is illustrated in FIG. 4, since channels may be organized by content type rather than just by user, this means that a user may receive notifications when live shares are available for a particular theme, content, geographic area, or other channel characteristic are available to viewing, as well as when shares for a particular user of the system are available.

Figure 5:
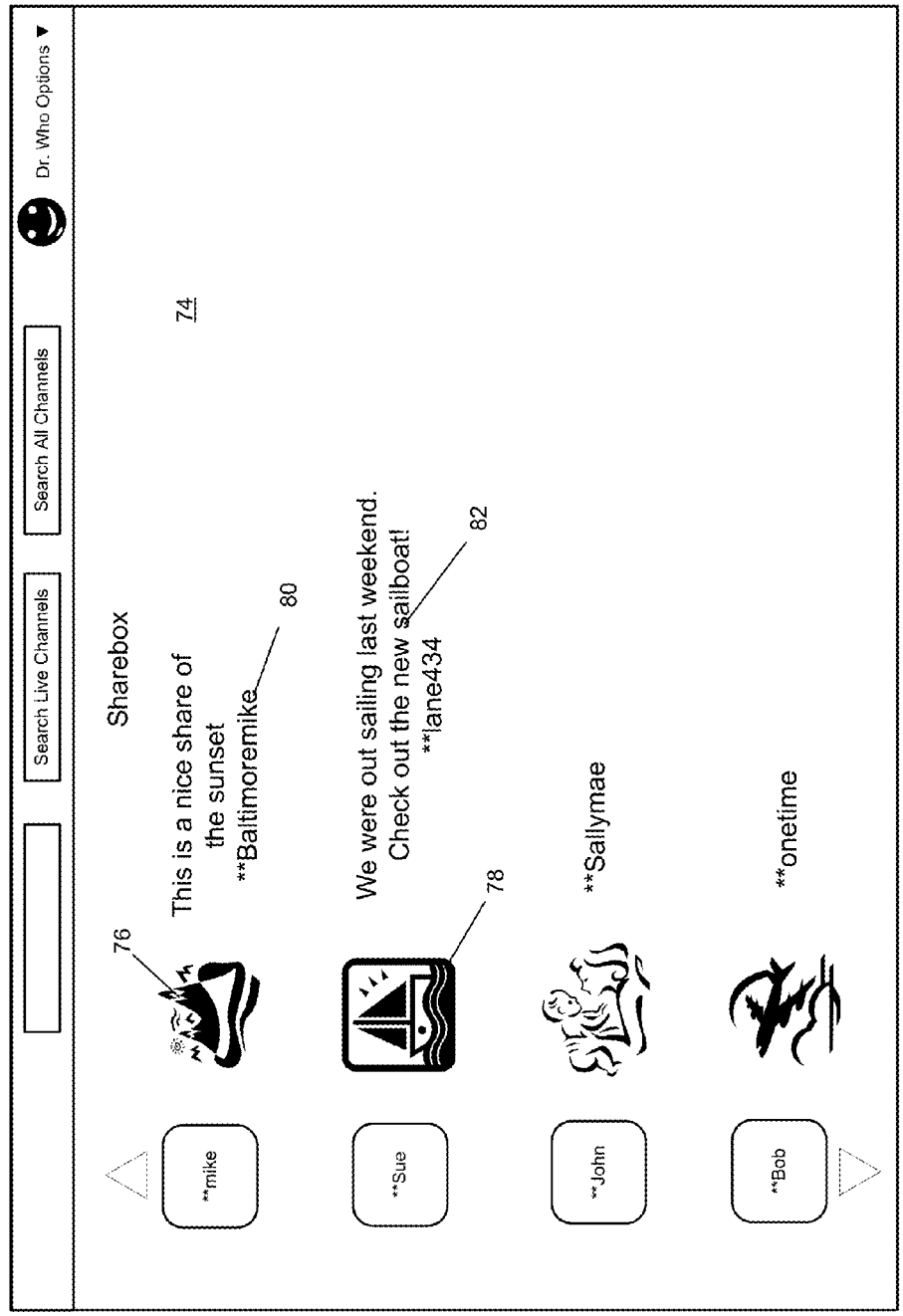
FIG. 5 is a view of an implementation of a sharebox interface.

FIG. 5 illustrates an implementation of a share-box interface 74 having a plurality of shares 76, 78 and associated text 80, 82. On the left-hand side of the screen, the duostar address for each user is shown in an icon next to the share icon. A scroll icon is shown to allow the subscriber to scroll through shares within their share-box interface 74. The associated text 80 82 may come from the user who shared the share with the viewing user, and/or may be added by the viewing user when the share arrives in the viewing user's share box interface 74. Shares in the share-box interface 74 may be either live shares or saved shares. Shares in the share-box may also be public shares or private shares. In various implementations, the flexibility of the share-box interface may permit a streaming user to send a live share to another receiving user and for the receiving user to send a corresponding live share back, enabling a video conference feature. Many other possibilities, including video messaging, are possible. When a user deletes a particular saved share from the system, as was previously described, it is permanently deleted, and also removed from being visible from the share-box interfaces associated with any other users who were given access to view the saved share. This behavior is enabled by use of the application server 10 and the database 12, which deletes any association in the database between the other saved users as well as deleting the saved video and audio data associated with that share.

Figure 6:
FIG. 6 is a view of the implementation of sharebox interface of FIG. 5 with one of the icons selected.

FIG. 6 illustrates the share-box interface (an example of a viewing interface) 74 of FIG. 5, showing the share associated with **mike in an enlarged size in response to being selected by the user. A user may select a share icon within the share-box to see the share in an enlarged size. The size may be any suitable size and may take up substantially the entire screen in various implementations. In addition, the subscriber may also be provided with options on clicking on the share as to how large they would like to view the shares in any of the interfaces as described herein. In the share-box interface 74 shown in FIG. 6, the share icon is shown enlarged but not as a full screen display. The share can be viewed in this size, or may enlarge itself to be full screen if desired by the user.

Figure 7:
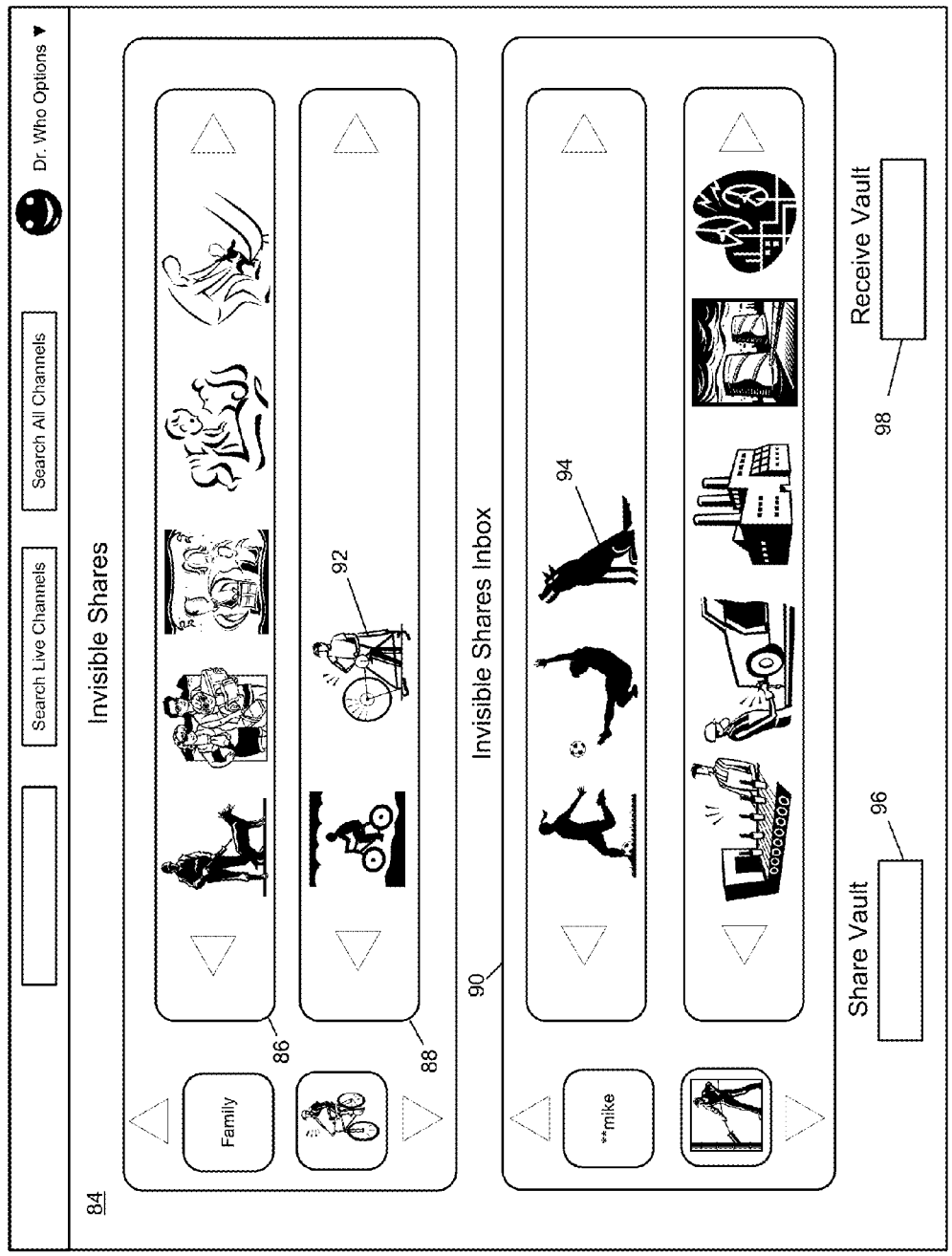
FIG. 7 is a view of an implementation of an invisible shares computer interface or an invisible computer interface.

FIG. 7 shows an implementation of an invisible shares interface 84 (invisible computer interface) that has invisible shares channels 86, 88 and an invisible shares inbox 90 each having icons 92, 94 corresponding with invisible shares. The term "invisible share," as used herein, is defined as a share that is only accessible by users that have been authorized by the submitting user and is not discoverable through a search using the search form 30, i.e., will never show up in any search results made using the search form 30 in any interface. The term "invisible computer interface" and "invisible shares interface" as used herein, is defined as a computer interface that contains invisible shares and/or invisible channels. As used herein, invisible computer interfaces are visible to the users associated with various computing devices used to generate them; the term "invisible" refers to the inability of anyone but that particular user to find any of the shares contained in that interface using the search form 30 and search functionality enabled by the database 12. The way the invisible shares are kept invisible may be through several methods. For example, the database 12 may simply not include any shares designated by users of the system 12 that contain a database record indicating the share is invisible from appearing in any search results or may simply never perform any searches or database queries that involve those shares, excluding them from the shares available for searching.

As illustrated, the invisible share interface includes channels containing invisible shares associated with the user and another one for invisible shares received from other users. Because invisible shares are not searchable, the only way for a viewing user of the system to view a streaming user's invisible share is for the streaming user to use a share vault 96 included in the interface 84. In a particular implementation, the streaming user inputs the viewing user's address (duostar) address into the share vault 96. The application server 2 then creates a database entry in the database 12 indicating that the viewing user is authorized to see all of the streaming user's invisible shares, and all of the available invisible shares for the streaming user, whether live or saved invisible shares then appear in the viewing user's invisible shares inbox 90. In other implementations, in order for the viewing user to see any shares (or a particular share), the streaming user needs to select one or more of the invisible shares and then input the viewing user's address into the share vault 96. The viewing user then inputs the streaming user's address into a receive vault 98 in an invisible computer interface associated with the viewing user. At that point, the application server 10 matches the database entries for the one or more invisible shares that indicated that these one or more invisible shares are to be made available to the viewing user, and they appear in the viewing user's invisible shares inbox. A consequence of both approaches is that while the viewing user can see all of the invisible shares for the streaming user, the streaming user cannot reciprocally see any of the invisible shares that the viewing user has in their invisible share channels or inbox. This affirmative invitation process may assist the system 2 with protecting the privacy and confidentiality of the information contained in the invisible shares.

In various implementations, the invisible shares interface 84 may be accessible following a streaming user or viewing user logging into the system 2 using their standard user name and password. In other implementations, the invisible shares interface 84 may be accessible only after the user enters additional login information in a separate login section on any one of the interfaces disclosed herein, or after selecting the option to login to the invisible shares interface 84 through the options dropdown interface located on the interfaces disclosed herein. The use of a separate login to access the invisible shares interface 84 may allow users to prevent unauthorized or inadvertent access by others who obtain access to their system account to the invisible shares they are streaming or have been given access to. Such a separate login may take the form and be similar to the structures used in medical applications where separate log-ins are required to access sensitive or otherwise specifically controlled information through the system. Such separate login capabilities to protect access to the invisible share interface 84 may be particularly useful where the system 2 permits users to remain logged into the system 2 for a period of time and does not require them to enter their login information during that time through the use of cookies and other user session persistence methods and systems.

As illustrated, the use of invisible shares may permit the system 2 to be utilized in situations where data privacy or confidentiality are important or valued by the users involved in the information exchange. For example, the invisible shares inbox 90 for the user illustrated contains an entire channel dedicated to work-related shares, which could include video inspection of factory equipment, confidential work-related meetings, prototyping and/or research and development discussions, and other items for which the ability of the general population of users of the system being able to see even in icon private share form in searches would be undesirable. Other users may simply want to protect their family privacy by ensuring that all family related shares are not visible at any time while they are being sent, and will use the invisible share interface 84 and the related methods to do so. A wide variety of possibilities are possible using the principles disclosed herein.

Figure 9:
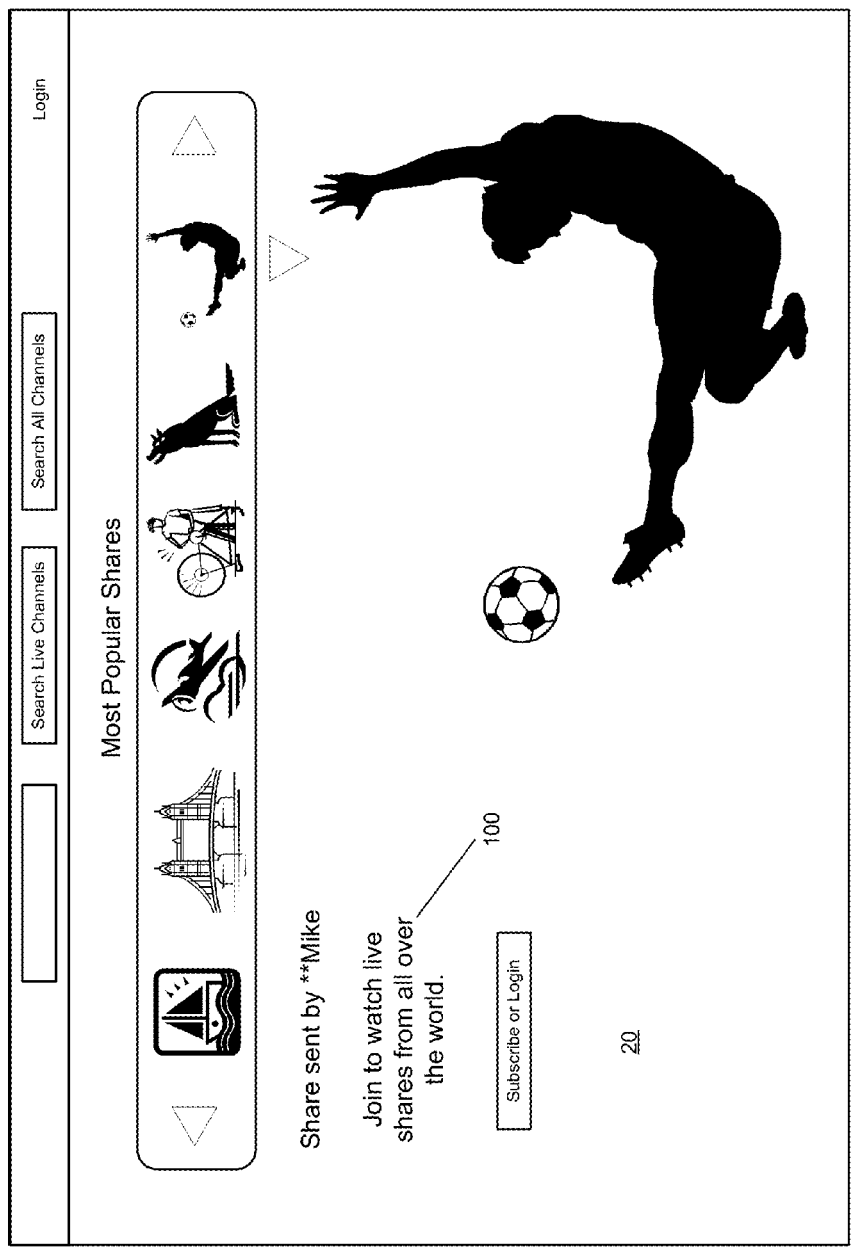
FIG. 9 is a view of an implementation of a computer interface or viewing interface.

Referring to FIG. 9, an implementation of the public computer interface (another example of a viewing interface) 20 of FIG. 8 is illustrated showing messaging 100 indicating that a particular public or private share associated with a particular user of the system has been sent to someone who has not yet established an account or is not currently logged into their account with the system 2. The messaging 100 includes the duostar address of the user who sent the share, and, as the share is a public share in this case included in the Most Popular Shares channel, the icon associated with that share is shown selected and enlarged in FIG. 9. In communicating the sending of the share to someone not currently logged into the system 2 or who is not yet a user of the system, the application server 10 or web server 18 may send an email, text or any other suitable electronic communication to someone as directed by the user, whereby the communication has a link to the website created by the system 2. When clicking on or activating the link, the computing device associated with the person receiving the link generates the computer interface illustrated in FIG. 9.

Figure 11:
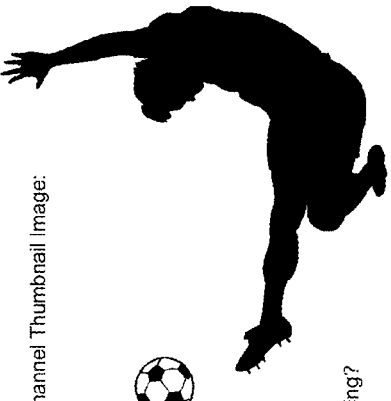
FIG. 11 is a view of a channel properties interface.

FIG. 11 illustrates an implementation of a channel data setup interface 102 associated with the system 2. As illustrated in FIG. 11, input fields are displayed for the user creating the channel to provide information related to a channel. The subscriber may label the channel and provide a user identified icon, and may provide search terms for the channel. In addition, a subscriber may designate a channel as public, private, or invisible. In some implementations, invisible channels are created only from the invisible computer interface 84. The user may also provide a list of users that are authorized to have access to the shares from this channel. A user may also provide a list of users or email addresses for sending out alerts when the selected channel is streaming a share.

When setting up a channel in the system, the user also creates one or more channel characteristics, which, through interaction between the application server 10 and the video camera 4 and/or portable computing device 6, become included in any share associated with that particular channel. A wide variety of channel characteristics may be included in various implementations, including all the aspects of channels already disclosed in this document as well as, by non-limiting example, geographical tags, automatic geographical search terms, contextual geographical search terms, contextual event search terms, GPS coordinates, user identities, and any other information desired to associate with the channel.

The term "geographical tags," as used herein, is defined as a digital location identifier that is included in the live POV video data sent to the system with a share, and may comprise global positioning coordinates, location names, and the like.

The term "automatic geographical search terms," as used herein, are search terms (channel characteristics) that the application server 10 assigns to a share that are related to the geographical tags. For example, the application server 10 may assign to a user's uploaded share taken at a football stadium in Philadelphia, automatic geographical search terms such as Pennsylvania, Philadelphia, and/or Lincoln Financial Field.

The term "contextual geographical search terms," as used herein, is defined as search terms (channel characteristics) that are related to the location where the share was recorded, as determined by the geographical tag. For example, a user may record a share of a football game from the stands in Lincoln Financial Field, and the application server 10 may ascertain through web based searching various contextual geographical search terms such as, football stadium, football game, professional football, NFL, Philadelphia Eagles, and the like. The application server 10 may automatically assign to the share or prompt the user with audio prompts through the capshall to select contextual geographical search terms related to the location.

The term "contextual event search terms," as used herein, is defined as search terms (channel characteristics) that are related to the location and time a share was recorded, as determined by embedded the geographical tag and time stamp. For example, a user may record a share of a football game from the stands in Lincoln Financial Field of the Eagles playing the New York Giants, and the application server 10 may ascertain through web based searching what type of event is taking place at the location and time. The application server 10 may then automatically assign to the share or prompt the user using audio through the capshall to select contextual geographical search terms related to the location. For example, contextual event search terms associated with the example provided may include, Philadelphia Eagles, New York Giants, NFL, and the like.

Figure 10:
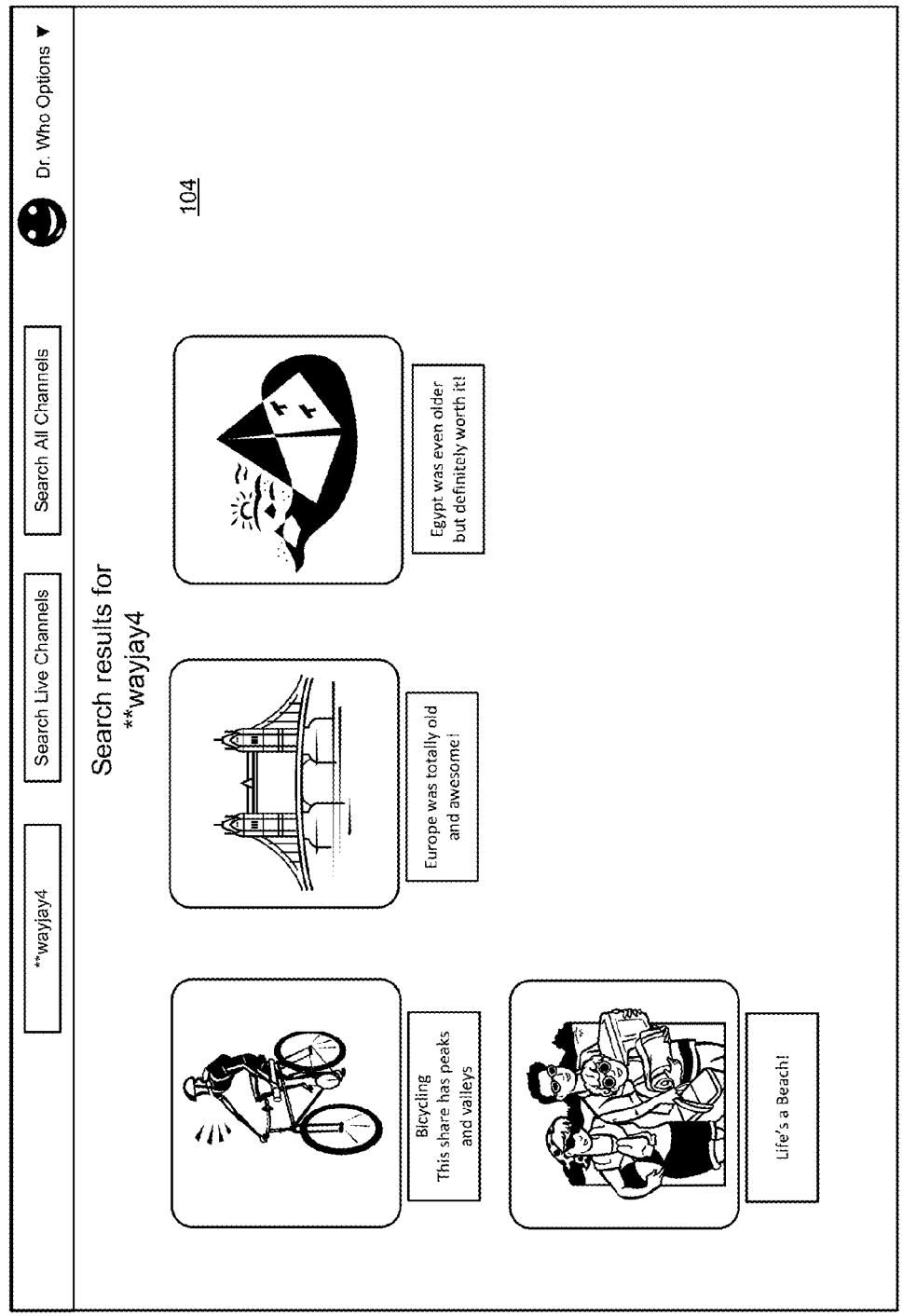
FIG. 10 is a view of a search results computer interface.

Referring to FIG. 10, an implementation of a search interface 104 displayed after the search form 30 has been used is illustrated. As illustrated, the search was run for the user with the duostar address of wayjay4, showing those public shares and private shares the searching user has access to. The interface 104** includes a search display, whereby one or more icons representing shares or channels are displayed. The user may then select an icon to view a share or a may request access to the channel, or subscribe to the channel. The search terms associated with a share may be input by the streaming user when setting up the channel or when streaming the share as previously discussed.

Any number of search terms may be associated with a share or channel. In one embodiment, a share may have a geographical tag that identifies the location where the share is being recorded as was previously discussed. A user searching for shares or channels by location may input a geographical area, and the application server 10 may return to the user share or channel icons having the associated geographical coordinates or coordinates within a programed distance. The programed distance may be any suitable distance and may be a function of the search term input by the user. For example, a user may input Baltimore as a search term, and channels or shares having a geographical coordinate within the greater Baltimore area may be displayed to the user. Likewise, a user may input the inner harbor of Baltimore as a search term and channels or shares having a geographic coordinate within the inner harbor area may be displayed to the user.

During playback of various shares, particularly those where search terms and/or geographical tags (or share content-related tags, terms, or keywords are associated with the share) targeted picture-in-picture advertising may be included in the field of view of the share on the computing device on which the viewing user is viewing the share. This could take the form of a static or animated advertisement (or even video advertising) placed in a separate frame in a corner of the main frame or in a portion of the interface in which the video associated with the share is playing. In some implementations, the ads are not live content, but are pre-recorded messages that are inserted into each video frame of live POV video by the system during streaming of each live video frame of POV video. In other implementations, the ads could be live content generated by an advertiser for playback during a particular share or during playback of shares sharing particular related content (such as, by non-limiting example, during a pledge drive to support content of the type the share is associated with).

Figure 12:
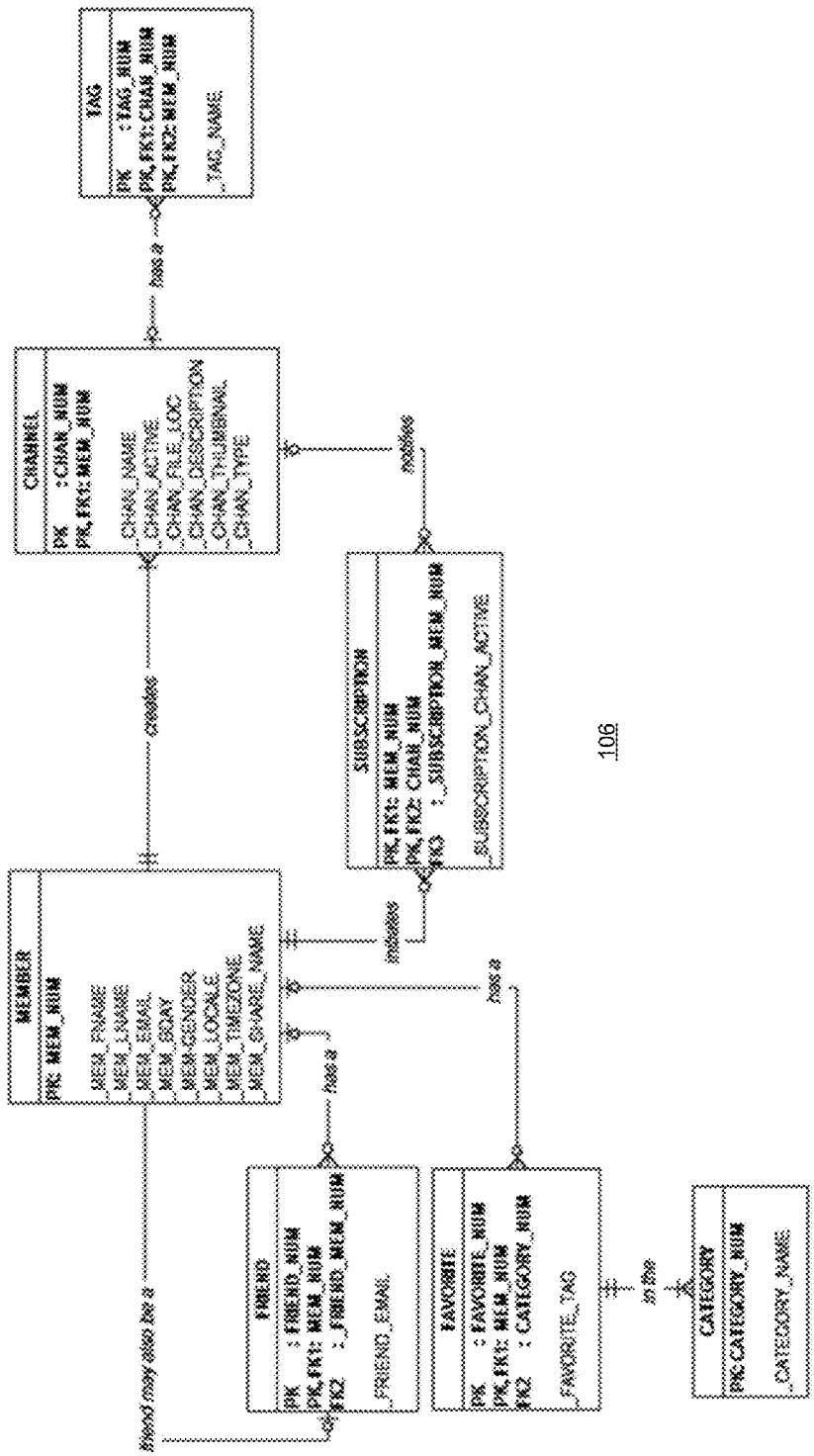
FIG. 12 is a database structure diagram of a database implementation.

Referring to FIG. 12, a database diagram 106 is illustrated for a particular implementation of a database 12 used in a system 2 implementation. As illustrated, the database includes a variety of tables with primary keys that enable the system 2, using the application server 10, video streaming server 8, and web server 18 to control, manage, set, and remove access to various shares to streaming and viewing users, as well as provide access by new users to the system 2.

Figure 13:
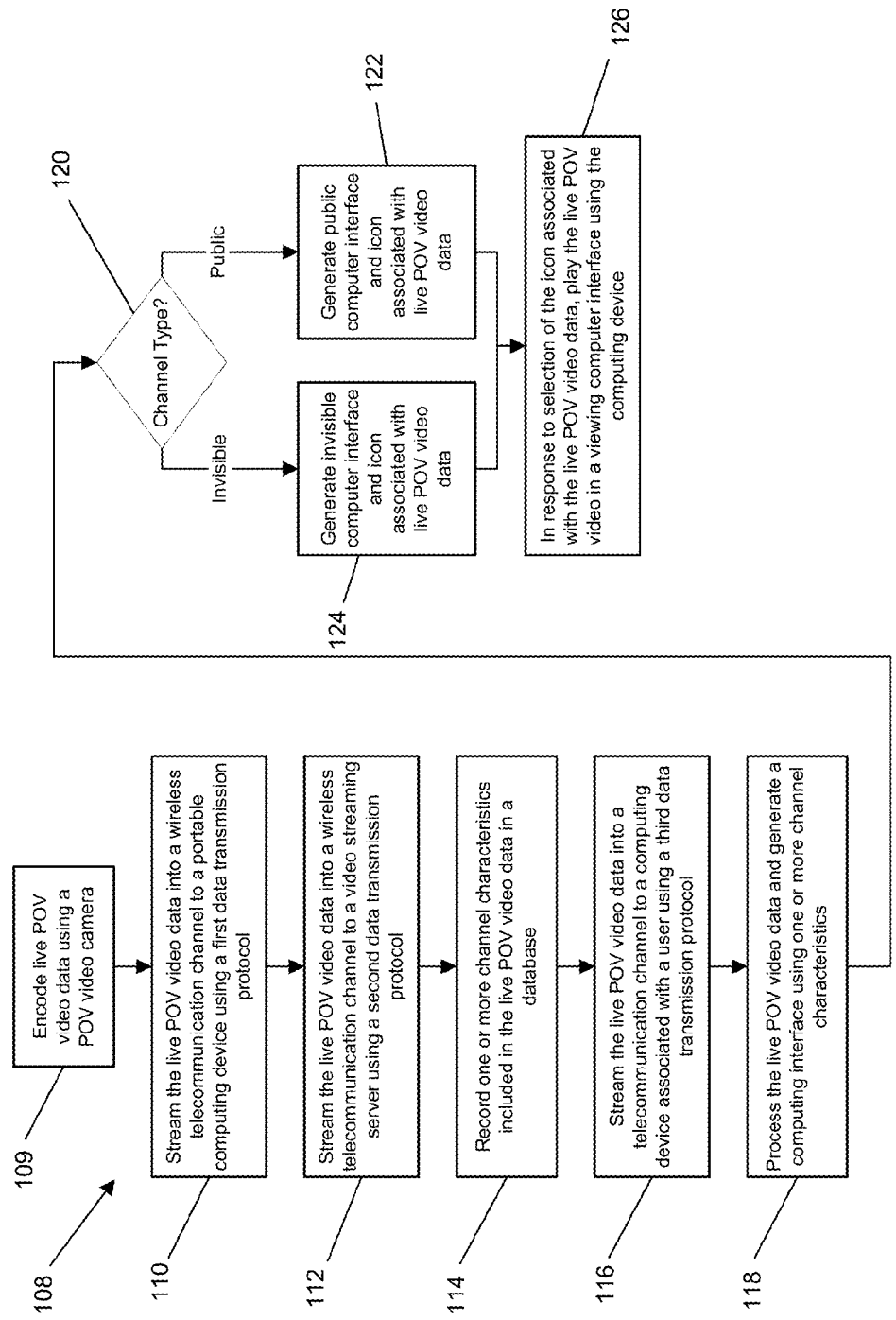
FIG. 13 is a flowchart of an implementation of a method of generating and transmitting live POV video.

Referring to FIG. 13, a flow diagram of an implementation of a method of generating and transmitting live streaming POV video 108 is illustrated. As illustrated, the method 108 includes encoding live POV video data using a POV video camera (step 109), which may be any POV video camera device disclosed in this document. The method 108 also includes streaming the live POV data into a wireless telecommunication channel to a portable computing device using a first data transmission protocol (step 110) and streaming the live POV video data into a wireless telecommunication channel to a video streaming server using a second data transmission protocol (step 112). The method may also include recording one or more channel characteristics included in the live POV video data in a database (step 114) and streaming the live POV video data into a telecommunication channel to a computing device associated with a user using a third data transmission protocol (step 116). The method 108 also includes processing the live POV video data a generating a computing interface using the one or more channel characteristics (step 118). The method 108 includes determining if the channel type is invisible or public (step 120), and if the channel type is public, then the method includes generating a public computer interface and icon associated with the live POV video (step 122). If the channel type is invisible, then the method includes generating an invisible computer interface and icon associated with the live POV video data (step 124). The method 108 also includes in response to selection of the icon associated with the live POV video data, playing the live POV video in a viewing computer interface using the computing device (step 126).

In various method implementations, the method may also include caching the live POV video data on the application server 10 (or video streaming server 8) to form a share and providing access to another user (viewing user) of the system to the share on the application server 10 using the database 12 and the application server 10 through generating an icon in a public computer interface, a private computer interface, or an invisible computer interface corresponding with the type of share, if the share is a public share, private share, or invisible share, respectively. Any of the interface types and share types disclosed herein may be employed.

For shares that are private shares or invisible shares, the method may include storing an entire quantity of live POV video data associated with the share on the application server 10 or video streaming server 8 and providing access to a viewing users of the system to the share on the application server 10 using the database 12 and the application server 10 through generating an icon in the private computer interface or the invisible computer interface corresponding with the share. In various implementations of the system, the user can use the system 2 to post the saved shares (private or invisible) to various other websites, such as YouTube for longer-term archiving of the content.

In various implementations the method may further include, in addition to caching the live POV video or storing the entire quantity of live POV video data on the application server 10 or the video streaming server 8 to create a share and then, in response to a selection of an address associated with another user (viewing user), creating an icon in a share box computer interface associated with other user using the database 12 and the application server 10 along with a computer device associated with the viewing user. This same method implementation can also be used to create a share icon in a channel that the viewing user has subscribed to.

Implementations of the method may further include, in addition to caching the live POV video or storing the entire quantity of live POV video data on the application server 10 or video streaming server 8 to create an invisible share, in response to entry of an address (duostar, for example) associated with the receiving user (viewing user) in a share vault associated with the user included in the invisible computer interface and entry of an address associated with the user of the system (streaming user) included in an invisible computer interface on a computing device associated with the receiving user, creating an icon in an invisible channel included in the invisible computer interface associated with the receiving user using the database 12 and the application server 10. Implementations of the method where the receiving user does not have to enter the streaming user's address into their receive vault may also be employed by various implementations of the system 2.

In various implementations of the system, the capshall may be operated using various methods. In particular implementations, the method 108 may include activating the POV video camera to enter a channel selection mode (which may be done by pressing a button on the capshall), audibly speaking one or more names of one or more channels associated with the user from the POV video camera using an earpiece coupled to the POV video camera (included in the audio component), receiving a selection of a channel (through the user pressing the button), audibly speaking the name associated with the selected channel (using the audio component), and activating the POV video camera to enter a recording mode. In the recording mode, the POV video camera begins to encode or otherwise stream live POV video data across the wireless telecommunication channel to the portable computing device 6.

When activating the capshall or POV video camera, the method may also include determining a location of the POV video camera using a GPS signal received by the POV video camera and a location services system (such as those marketed under the tradename GOOGLE LOCATION SERVICES by Google, Inc.) access wirelessly by the POV video camera through the portable computing device associated with the user. The method may also include assigning one or more contextual geographical search terms to the channel selected using the location and the POV video camera and including the location or the one or more contextual geographical search terms in the one or more channel characteristics. The one or more channel characteristics may be any disclosed in this document.

In places where the description above refers to particular implementations of live streaming video sharing systems, related methods, and implementing components, sub-components, methods and sub-methods, it should be readily apparent that a number of modifications may be made without departing from the spirit thereof and that these implementations, implementing components, sub-components, methods and sub-methods may be applied to other live streaming video sharing systems and related methods.

What is claimed is:

1. A method of generating and transmitting live streaming point-of-view (POV) video, the method comprising:
encoding live POV video data using a POV video camera;

streaming the live POV video data into a wireless telecommunication channel to a portable computing device operatively wirelessly coupled with the video camera, the live POV video data transmitted using a first data transmission protocol;

streaming the live POV video data into a wireless telecommunication channel to a video streaming server operatively coupled with the portable computing device through a wireless telecommunication channel, the live POV video data transmitted using a second data transmission protocol;

in response to receiving the live POV video data, recording one or more channel characteristics associated with the live POV video and included in the live POV video data in a database operatively coupled with the video streaming server and an application server, using one of the video streaming server and the application server;

streaming the live POV video data into a telecommunication channel to a computing device associated with a user using one of the video streaming server, the application server, and a web server, the live POV video data transmitted using a third data transmission protocol; and processing the live POV video data and generating a computer interface using the computing device and the one or more channel characteristics, the computer interface comprising:
  if the one or more channel characteristics indicate the live POV video data is associated with a public channel, a public computer interface comprising the live POV video data, the public computer interface configured to allow a public user of the system to view the live POV video data;
  if the one or more channel characteristics indicate the live POV video data is associated with an invisible channel associated with the user, an invisible computer interface comprising the live POV video data, the invisible computer interface configured to allow a user of the system having authorization to view the invisible channel to view the live POV video data.

2. The method of claim 1, further comprising:

caching the live POV video data on the application server to form a share; and providing access to another user of the system to the share on the application server using the database and the application server by generating an icon in one of the public computer interface, a private computer interface, and the invisible computer interface corresponding with the share if the share is a public share, private share, or invisible share, respectively.

3. A method of transmitting live streaming video to a public channel and to an invisible channel, the method comprising:

receiving live video data using a streaming server from a wireless telecommunication channel, the live video data transmitted using a second data transmission protocol and a portable computing device, the portable computing device receiving the live video data from a wireless telecommunication channel using a first data transmission protocol from a video camera;

in response to receiving the live video data, recording one or more channel characteristics associated with the live video and included in the live video data in a database operatively coupled with the video streaming server and an application server, using one of the application server and the video streaming server;

providing access to the live video data using the database and the one or more channel characteristics through a telecommunication channel using one of the video streaming server, the application server, and a web server, wherein one of the video streaming server, the application server, and the web server are adapted to, in response to a request from a computing device associated with a user, stream the live video data using the telecommunication channel and a third data transmission protocol to the computing device, where the computing device is adapted to generate a computer interface using the computing device and the one or more channel characteristics where the computer interface comprises:
  if the one or more channel characteristics indicate the live video data is associated with a public channel, a public computer interface, wherein the public computer interface comprises the live video data and the public computer interface is configured to allow a public user of the system to view the live video data;
  if the one or more channel characteristics indicate the live video data is associated with an invisible channel associated with the user, a private computer interface, wherein the private computer interface is configured to allow a user of the system authorized to view the invisible channel to view the live video data.

4. The method of claim 3, further comprising:

sharing the live video data with another user of the system by:

one of caching the live video data and storing an entire quantity of live video data using one of the application server and the video streaming server to create a share; and in response to a selection of an address associated with the other user, creating an icon in a sharebox computer interface associated with the other user using the database and the application server and a computing device associated with the other user.

* * * * *